United States Patent
Cai

(10) Patent No.: US 8,269,362 B2
(45) Date of Patent: Sep. 18, 2012

(54) CONSTANT DIRECTION FOUR QUADRANT LIFT TYPE VERTICAL SHAFT WIND POWER GENERATOR

(76) Inventor: Xinyi Cai, Wuxi (CN)

( * ) Notice: Subject to any disclaimer, the term of this patent is extended or adjusted under 35 U.S.C. 154(b) by 232 days.

(21) Appl. No.: 12/743,650

(22) PCT Filed: Dec. 4, 2007

(86) PCT No.: PCT/CN2007/003442
§ 371 (c)(1),
(2), (4) Date: May 19, 2010

(87) PCT Pub. No.: WO2009/067845
PCT Pub. Date: Jun. 4, 2009

(65) Prior Publication Data
US 2010/0244456 A1    Sep. 30, 2010

(30) Foreign Application Priority Data
Nov. 28, 2007 (CN) .......................... 2007 1 0190673

(51) Int. Cl.
*F03D 9/00* (2006.01)
*H02P 9/04* (2006.01)

(52) U.S. Cl. ............................................ 290/44; 290/55
(58) Field of Classification Search .................... 290/44, 290/55; 415/4.1, 4.2, 4.5, 2.1
See application file for complete search history.

(56) References Cited

U.S. PATENT DOCUMENTS

| | | | | |
|---|---|---|---|---|
| 4,299,537 A | * | 11/1981 | Evans | 416/119 |
| 4,415,312 A | * | 11/1983 | Brenneman | 416/119 |
| 4,464,579 A | * | 8/1984 | Schwarz | 290/44 |
| 4,609,827 A | * | 9/1986 | Nepple | 290/44 |
| 5,194,754 A | * | 3/1993 | Mikami | 290/55 |
| 7,126,235 B2 | * | 10/2006 | Bernhoff et al. | 290/44 |
| 2005/0151376 A1 | * | 7/2005 | Bernhoff et al. | 290/44 |
| 2006/0210389 A1 | * | 9/2006 | St-Germain et al. | 415/4.2 |
| 2007/0177970 A1 | | 8/2007 | Yokoi | |
| 2008/0227378 A1 | | 9/2008 | Yokoi | |
| 2008/0309090 A1 | * | 12/2008 | Stern et al. | 290/55 |

FOREIGN PATENT DOCUMENTS

| | | |
|---|---|---|
| CN | 2067768 U | 12/1990 |
| CN | 1062192 A | 6/1992 |
| CN | 2777233 Y | 5/2006 |
| CN | 1824947 A | 8/2006 |
| CN | 2802114 Y | 8/2006 |
| CN | 1831328 A | 9/2006 |
| CN | 1938516 A | 3/2007 |
| CN | 1963192 A | 5/2007 |
| DE | 202006001766 U1 | 5/2006 |
| WO | 2006/095396 A1 | 9/2006 |

* cited by examiner

*Primary Examiner* — Julio C. Gonzalez
(74) *Attorney, Agent, or Firm* — The Webb Law Firm

(57) ABSTRACT

A constant direction four quadrant lift type vertical shaft wind power generator is provided, which includes a truss-type wind wheel formed by an upper wind disc (5), a lower wind disc (3), and supporting rods (11); a speeder (8); and a generator (9), in which the wind wheel and the speeder (8) are sleeved on a central shaft (2), several groups of vanes (7) are perpendicularly arranged at a diametral top end of the wind wheel by their respective pivots (10), the wind wheel and the vanes (7) are disposed at an upper end of the equipment, and the generator (9), the speeder (8), and a controller are disposed at a bottom of the equipment. The wind power generator can be conveniently installed, operated, and maintained.

9 Claims, 5 Drawing Sheets

CONSTANT DIRECTION FOUR QUADRANT LIFT TYPE VERTICAL SHAFT WIND POWER GENERATOR

BACKGROUND OF THE INVENTION

1. Field of Invention

The present invention relates to a vertical-shaft wind power generator in a new energy field, and more particularly to a constant direction four quadrant lift type vertical shaft wind power generator.

2. Related Art

It is well-known that vanes of a vertical-shaft wind power generator generate a driving force at one side of the pivots and inevitably produce resistance when they rotate to the other side of the pivots based on the aerodynamic principle. Therefore, the power generation efficiency is not very high. For a long time, researchers have been working hard at researches about the vane shape, for example, the Savoninc vane enables the power to be greater than the resistance to accomplish other advantages of the vertical-shaft wind power generator. Currently, hundreds of design patents about the vertical-shaft wind power generator are available. Unfortunately, the power generation efficiency still cannot catch up with the horizontal-shaft wind power generator, with the exception of the France Darrieus vertical-shaft wind power generator. But the France Darrieus vertical-shaft wind power generator cannot realize self-start and may stop rotating at a small wind.

SUMMARY OF THE INVENTION

In view of the defects of the current vertical-shaft wind power generator, the present invention is directed to a vertical-shaft wind power generator with a high power generation efficiency by making full use of the aerodynamic principle in combination with scientific experiment methods, and the wind power generator is convenient to install, operate, and maintain, and has stable and reliable performance.

The objective of the present invention is implemented through the following measures.

A constant direction four quadrant lift type vertical shaft wind power generator is provided, which includes a truss-type wind wheel formed by an upper wind disc, a lower wind disc, and supporting rods; a speeder; and a generator, in which the wind wheel and the speeder are sleeved on a central shaft, several groups of vanes are perpendicularly arranged at a diametral top end of the wind wheel by their respective pivots, the wind wheel and the vanes are disposed at an upper end of the equipment, and the generator, the speeder, and a controller are disposed at a bottom of the equipment, which can be realized through landing installation.

An overall shape of the vanes is an air-foil shape with equal cross sections, and a height of the vanes is equivalent to that of the wind wheel. A shape of the cross section is that, a circular-arc radius of a head portion is $1/18$-$1/22$ of a vane chord length, an arc radius of an outer surface is $3/8$ of the chord length, an arc radius of an inner surface is $3/16$ of the chord length, a central angle of an overall circular-arc portion is 40-50 degrees, an arch height of a circular arc of the outer surface is $1/5$-$1/7$ of the chord length, and an arch height of a circle chord of the inner surface is $1/10$-$1/14$ of the chord length; a back portion of each of the vanes is linear intersection between the outer surface and the inner surface; and the pivots of the vanes are located at positions $1/7$-$1/6$ of the chord length from the head portion.

A number of the vanes is three or an integral multiple of three, the wind wheel is of a corresponding regular polygon structure, and each of the vanes is perpendicularly arranged at a corresponding vertex angle position of the wind wheel. The vanes are of a hollow structure with a framework braced therein. An arc-shaped wind collecting baffle is disposed at an upwind side of the wind wheel to increase the wind force volume of the vanes and increase the output power. The vanes are made of light, weather-resistant, and corrosion-resistant materials.

A stop mechanism is disposed at a top and/or bottom portion of the pivots of the vanes, and the top and/or bottom portion of the pivots is correspondingly sleeved with a disc having a fan-shaped notch fitting with the pivots, a central angle of the notch is 65-75 degrees, and the stop mechanism is axially or radially arranged to fit with the fan-shaped notch, so as to control a maximum angle of attack to be 25-30 degrees when the vanes are in an upwind direction and a maximum angle of attack to be 40-45 degrees when the vanes are in a downwind direction. As a result, the vanes are changed at this position. Under the effect of the wind power, four quadrants are all corresponding to the lift force due to the aerodynamic principle.

The stop mechanism is a mechanical type or electrical type, and performs a stopping operation on the vanes by being inserted into and withdrawn out of the fan-shaped notch through a sliding rod. The mechanical-type stop mechanism includes a stop assembly and a sliding rod. A guiding wheel is disposed at two sides of the sliding rod, a front end is connected with a sliding wheel, and a back end is connected with a windward baffle at the upper portion of the wind wheel through steel wires. The electrical-type stop mechanism includes an anemometer and a motor mechanism.

When encountering a strong wind, the windward baffle or anemometer enables the sliding rod to withdraw out of the fan-shaped notch under the electrical or mechanical driving motion, and the vanes automatically rotate downwind to reach positions where the wind force is at the minimum level, so as to avoid being damaged, and then the vanes are automatically restored after the strong wind. In order to enhance the wind-resistant capability of the entire generator, medium and large-scaled units are fixed by adding inclined steel wire cables at a top end thereof. In order to increase the power generation capability, the wind wheel can be stacked and expanded in a building block mode.

COMPARED WITH THE PRIOR ART, THE PRESENT INVENTION HAS THE FOLLOWING ADVANTAGES

In the wind power generator structure developed by making use of the aerodynamic principle in combination with scientific experiments according to the present invention, during the rotation of the wind wheel, the vanes are always maintained at a state of generating lift force, and the tangential component force thereof drives the wind wheel to continuously rotate towards a constant direction.

The power generation efficiency of the present invention is higher than that of the commonly used horizontal-shaft wind power generator, without using a windward mechanism or hoisting an engine room weighing up to tens of tons and including a generator and a speeding gear case therein to a tower top of tens of meters. In addition, the controller, generator, and speeder are very simple and are not restrained by the weight. The vane does not need to support its own weight, but only acts upon the wind power to push the wind wheel, which is not of a cantilever structure and is made portable. Meanwhile, the technical requirements on the controller, vanes, and metal framework are reduced, thereby resulting in the decreased manufacturing cost and conveniences in installation, operation, and maintenance, and making full use of the advantages of the vertical-shaft wind power generator and promoting the development of the wind power generator industry.

In addition, the present invention further includes a flexible strong wind cutout protection mechanism. The vanes are arranged downwind when the wind is strong, and the force impinged on the vanes is reduced to the minimum level, and then the vanes are automatically restored after the strong wind. This is essential for the safety and reliability of the wind power generator.

The engine room of the present invention is implemented through landing installation, which greatly improves the stability, reliability, and installation, operation, and maintenance performances, and reduces the requirements on the units and framework intensity. The wind wheel can be stacked in a building block mode, so as to increase the power and be convenient for the standardization of the assembly.

The overall cost of the present invention can be reduced below 70% of the commonly used horizontal-shaft wind power generator. Besides, the wind power generator of the present invention is more stable and reliable, which is expected to reduce the online electricity price of the wind power generation to a level close to that of the coal power generation, thereby greatly promoting the development of the wind power industry, speeding up the construction of the wind power fields, saving energy and reducing exhaustion, and producing far-reaching impacts on improving the economic and social benefits.

The cross sections of the vanes are not changed along the whole length, which conforms to the Bernoulli's theorem, i.e., when the wind blows the vanes, the lift force is generated. The shape of the cross sections of the vanes used in the present invention is also decided through aerodynamic experiments, and the shape of the cross sections of the vanes is combined with the wind wheel structure to achieve higher power generation efficiency.

In order to overcome the problem about the poor power generation efficiency of the existing vertical-shaft wind power generator, the present invention provides a constant direction four quadrant lift type vertical shaft wind power generator. Furthermore, according to the national standard, a power output characteristic test of a wind power generator in a wind tunnel is carried out in the state authorized laboratory named China Ship Scientific Research Center of the China Shipbuilding Industry Corporation (CSIC), and the specific test contents can be obtained with reference to Appendix 1 *China's National Defense Scientific and Technical Report*. The experiment is based on the national standard *Off-Grid Wind Turbine Generator Systems-Part 3: Wind Tunnel Test Methods* (GB/T19068.3-2003). The test samples include a ZXVWG wind power generator (two models, i.e., 200 W and 300 W) developed according to the present invention and a traditional triple-vane horizontal-shaft power generator with a model of FD-400 (400 W), and the test contents include two aspects, i.e., startup wind speed and power output characteristics.

The report provides the test results of the above wind power generators in the wind tunnel, analyzes the test structures, and compares the power outputs at a wind speed of 12 m/s. As seen from the test, in terms of the startup wind speed, ZXVWG is 2.8 m/s and FD-400 is 3.3 m/s. At a wind speed of 12 m/s, ZXVWG-200 wind power generator can obtain the output power equal to that of the FD-400 traditional wind power generator, although the swept area of the former is about 26% less than that of the latter. ZXVWG-300 wind power generator outputs a power up to 187.4 W at the wind speed of 12 m/s, which is about 26% greater than that of the FD-400 traditional wind power generator. The output characteristic curves of the three types of wind power generators can also be obtained with reference to FIG. 5, and it can be expected from the curve tendency that, with the increase of the wind speed, ZXVWG-300 wind power generator is likely to generate greater output power. Please refer to Table 1 for the comparison results.

TABLE 1

Comparison table for test results at a wind speed of 12 m/s

| Generator Model | Generator Rated Power (W) | Swept Area ($m^2$) | Output Power of Generators at Wind Speed of 12 m/s |
|---|---|---|---|
| ZXVWG-300 | 300 | 1.68 | 187.4 |
| ZXVWG-200 | 200 | 1.68 | 148.6 |
| FD-400 | 400 | 2.27 | 148.8 |

In the above drawings: 1. Support, 2. Central shaft, 3. Lower wind disc, 4. Strut, 5. Upper wind disc, 6. Strong wind cutout protection device, 7. Vane, 7-1. First vane, 7-2. Second vane, 7-3. Third vane, 7-4. Fourth vane, 7-5. Fifth vane, 7-6. Sixth vane, 8. Speeder, 9. Generator, 10. Pivot, 11. Supporting rod, 12. Stop assembly, 13. Sliding wheel at top end, 14. Sliding rod, 15. Sliding wheel, 16. Disc, R1. Circular-arc radius of head portion, R2. Circular-arc radius of inner surface, R3. Circular-arc radius of outer surface, L. Chord length, h1. Arch height of external arc, h2. Arch height of internal arc, $\alpha_1$. Angle of attack in upwind direction, $\alpha_2$. Angle of attack in downwind direction, β. Fan-shaped notch, and γ. Central angle of circular-arc portion.

DETAILED DESCRIPTION OF THE INVENTION

The present invention is further described below with reference to the accompanying drawings.

Figure 1:
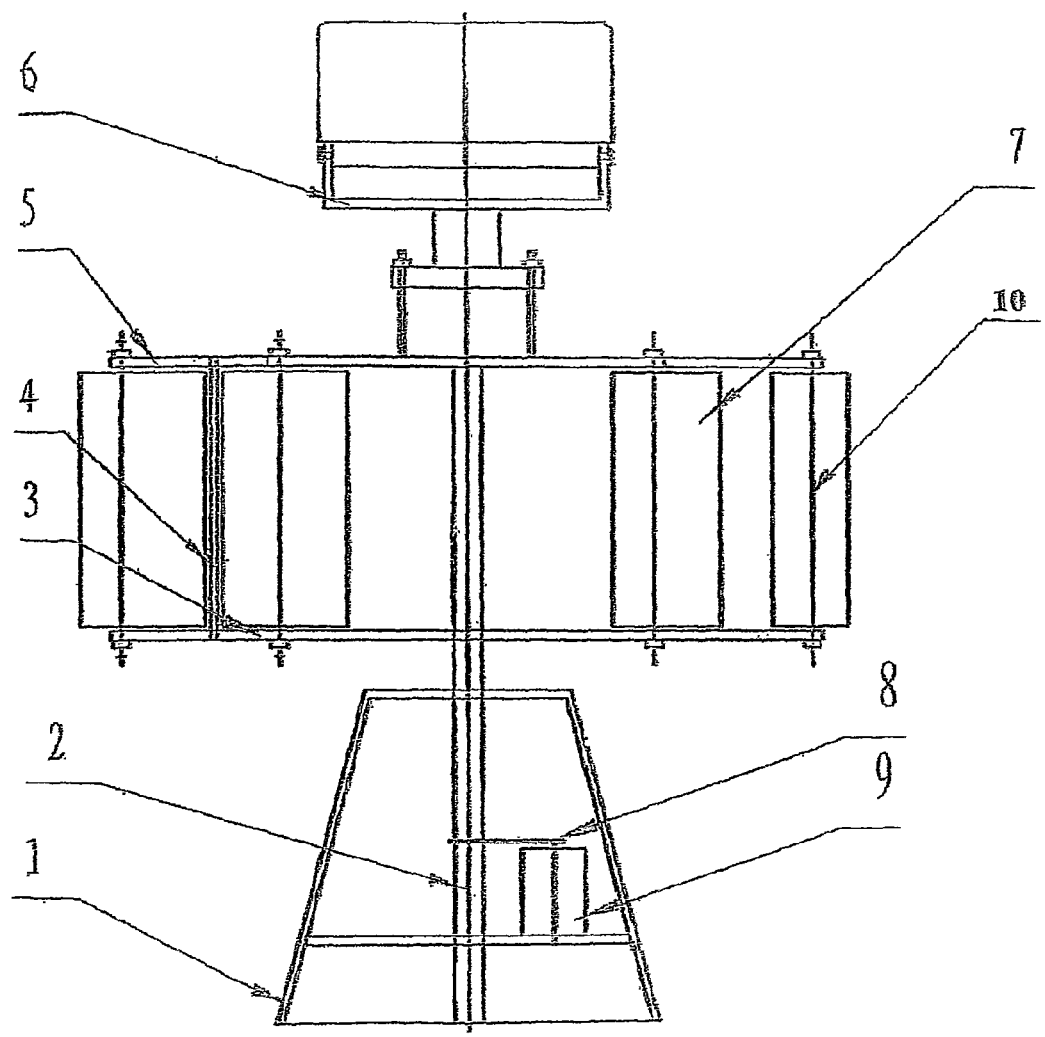
FIG. 1 is a schematic structural view of a wind power generator.

As shown in FIG. 1, the bottom portion of the wind power generator of the present invention is a support, and at a middle height position of the support 1, a platform with a generator and a speeder installed thereon is configured. A central shaft 2 is arranged in the center of the support. A wind wheel is sleeved on the central shaft, in which a radial thrust bearing is installed on the lower end thereof and a journal bearing is installed on the top end thereof to ensure that the wind wheel can flexibly rotate while being sleeved on the central shaft 2. A generator 9, a speeder 8, and a controller can also be implemented through landing installation. When rotating, the wind wheel drives the speeder 8 at the lower end to rotate and then drives the generator 9 to generate power. The positions of vanes 7 where the vanes change their locations among different quadrants under the effect of the wind power are restrained by a stop mechanism. A baffle or anemometer of a strong wind cutout protection device 6 is disposed at the top portion. When the wind power exceeds a predetermined value, the baffle falls down, the stop mechanism is withdrawn, and the vanes 7 automatically orientate windward in the strong wind, and the force impinged on the vanes 7 are turned to a minimum state, so as to protect the vanes 7 from being damaged.

Figure 2:
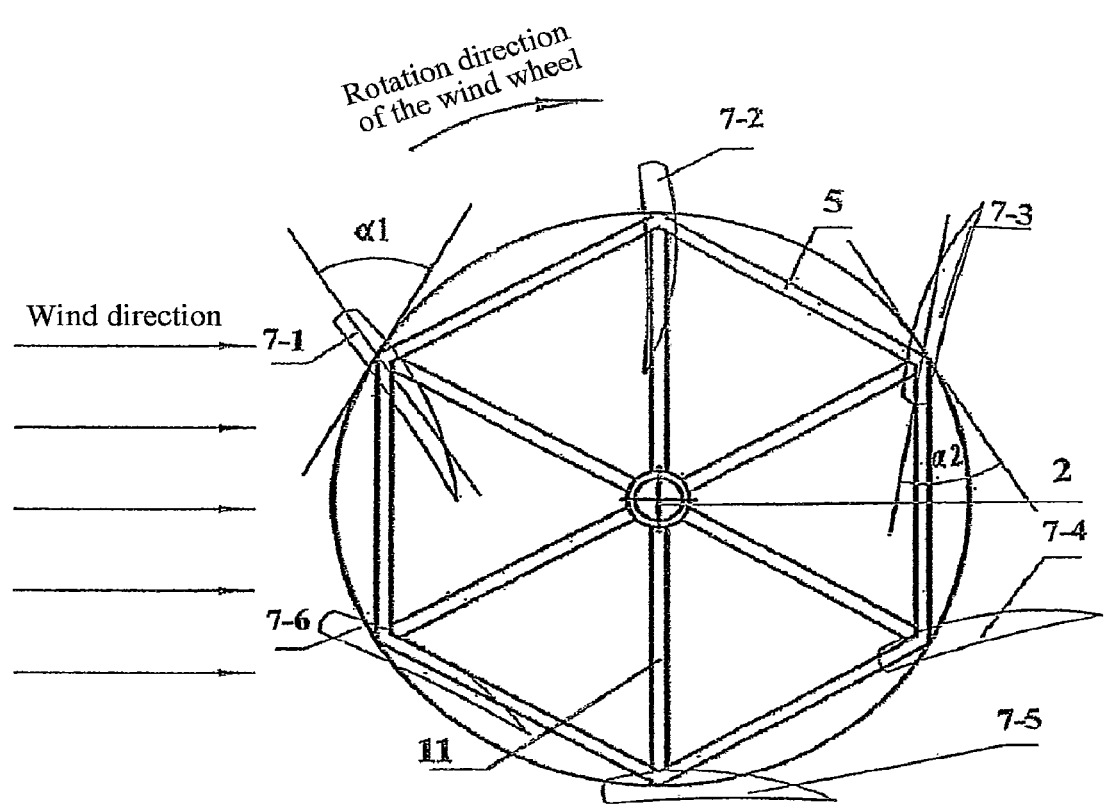
FIG. 2 is a diagram illustrating working principle of a wind power generator.

As shown in FIG. 2, the number of the vanes 7 in the wind power generator of the present invention is selected to be 6, that is, a first vane 7-1, a second vane 7-2, a third vane 7-3, a fourth vane 7-4, a fifth vane 7-5, and a sixth vane 7-6 respectively. An upper wind disc 5 and a lower wind disc 3 are both of a regular polygon structure and the upper and lower wind discs and supporting rods 11 constitute a truss-type wind wheel. Each of the vanes 7 is perpendicularly arranged at a corresponding vertex angle position of the upper and lower wind discs. Pivots 10 of the vanes are all installed with bearings.

Figure 3:
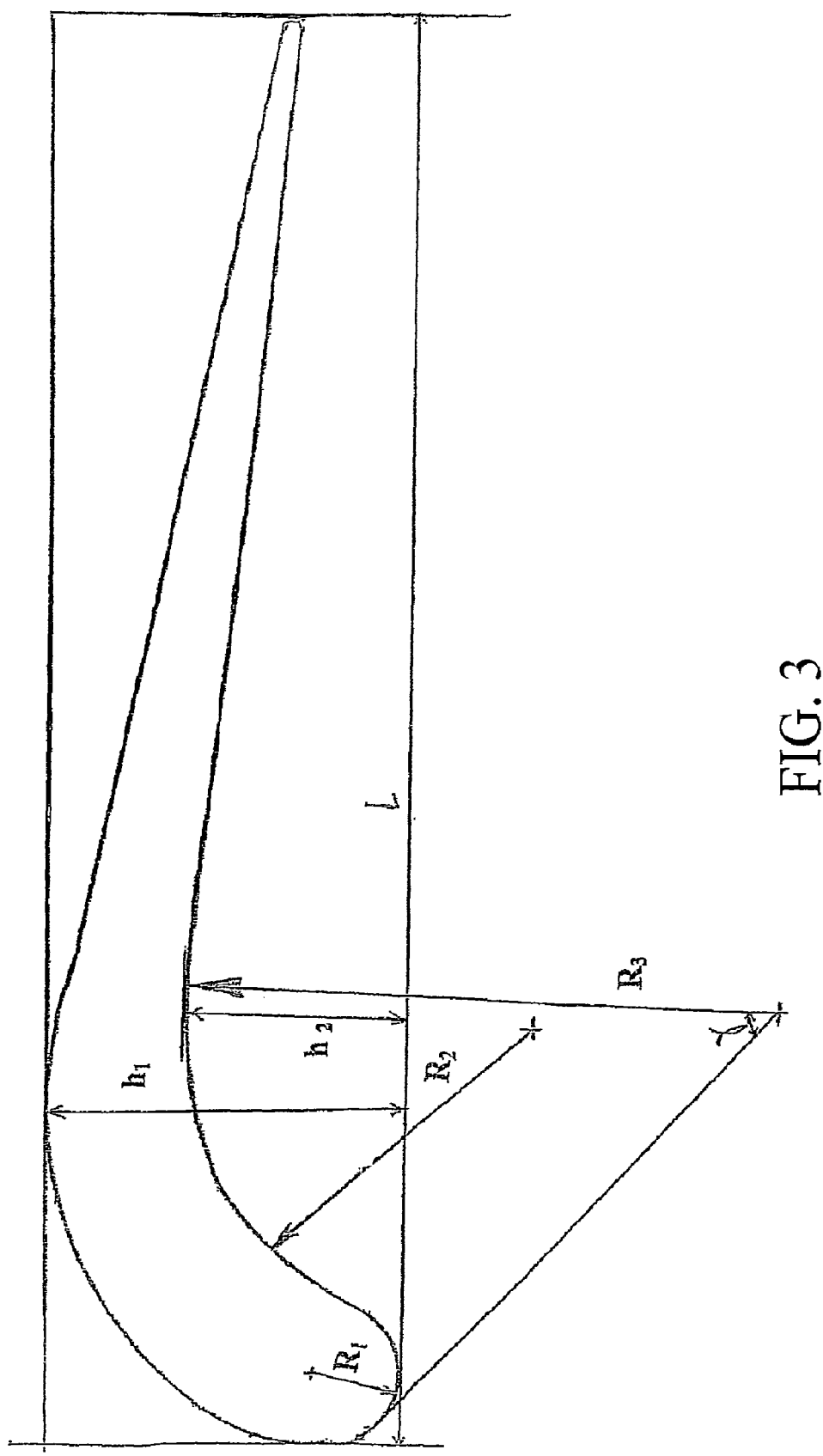
FIG. 3 is a schematic structural view of a vane.

As shown in FIG. 3, an overall shape of the vanes 7 of the present invention is an air-foil shape and of a hollow structure with a framework braced therein. The vanes 7 are designed with equal cross sections and the height of the vanes is equivalent to that of the wind wheel. The shape of the cross section is specifically that, a circular-arc radius of a head portion R1 is $1/18$-$1/22$ of a vane chord length L, an arc radius of an outer surface R3 is $3/8$ of the chord length L, an arc radius of an inner surface R2 is $3/16$ of the chord length; a central angle γ of an overall circular-arc portion is 40-50 degrees, an arch height of a circular arc of the outer surface (i.e., an outer arch height h1) is $1/5$-$1/7$ of the chord length, an arch height of a circle chord of the inner surface (i.e., an inner arch height h2) is $1/10$-$1/14$ of the chord length, a back portion of each of the vanes is linear intersection between the outer surface and the inner surface, and the pivots 10 of the vanes are located at positions $1/7$-$1/6$ of the chord length from the head. The vanes 7 are made of light, weather-resistant, and corrosion-resistant materials, so that the requirement for the mechanical intensity of the materials of the vanes 7 is rather low.

The present invention may further add an arc-shaped wind collecting baffle in an upwind direction of the wind wheel, so as to collect the incoming winds, increase the force impinged on the vanes, and increase the output power.

Figure 4:
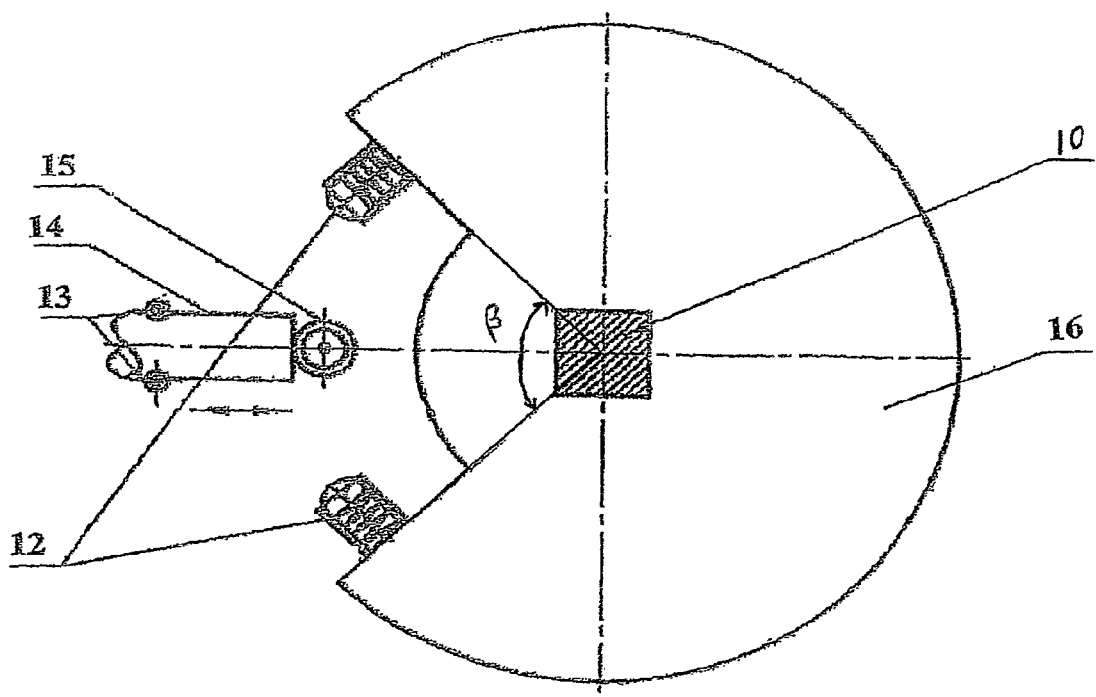
FIG. 4 is a schematic structural view of a stop mechanism.

As shown in FIG. 4, a stop mechanism is disposed at a bottom portion of the pivots 10 of the vanes, and the bottom portion of the pivots 10 is correspondingly sleeved with a disc 16 having a fan-shaped notch β fitting with the pivots. A central angle of the notch is 65-75 degrees, and the stop mechanism is axially or radially arranged to fit with the fan-shaped notch β, so as to control a maximum angle of attack to be 25-30 degrees when the vanes 7 are in an upwind direction and a maximum angle of attack to be 40-45 degrees when the vanes 7 are in a downwind direction. As shown in FIG. 4, a mechanical-type stop mechanism includes a stop assembly 12 and a sliding rod 14. A guiding wheel 13 is disposed at a top end of two sides of the sliding rod 14, a front end is connected with a sliding wheel 15, and a back end is connected with a windward baffle at the upper portion of the wind wheel through steel wires. In a normal situation, the sliding rod 14 is inserted into the notch of the disc 16 and performs a stopping operation on a rotating angle of the vanes. When encountering a strong wind, the windward baffle drives the sliding rod 14 to be withdrawn out of the notch, and the vanes 7 automatically rotate downwind to reach a position where the wind force is at the minimum level, so as to avoid being damaged, and then the vanes 7 are restored automatically after the strong wind. The vanes 7 of the present invention are changed at the illustrated positions. Under the effect of the wind power, four quadrants are all corresponding to the lift force due to the aerodynamic principle.

The stop mechanism may be disposed at a top portion of the pivots 10 of the vanes, and may also be disposed at the top or bottom portion of the pivots at the same time.

In additional to the above mechanical-type structure, the stop mechanism may further adopt an electrical-type structure. The electrical-type stop mechanism automatically detects and controls the sliding rod to be withdrawn out of and inserted into the fan-shaped notch of the pivots of the vanes through an anemometer and a motor mechanism, so as to control the angle of attack of the vanes. When encountering a strong wind, the anemometer enables the sliding rod 14 to be withdrawn out of the notch under an electrical driving motion, and the vanes 7 automatically rotate downwind to reach a position where the wind force is at the minimum level, so as to avoid being damaged, and then the vanes 7 are automatically restored after the strong wind.

In order to increase the power generation capability, the wind wheel can be stacked and expanded in a building block mode. In order to enhance the wind-resistant capability of the entire generator, medium and large-scaled units are fixed by adding inclined steel wire cables at a top end thereof.

The number of the vanes in the wind power generator of the present invention may be selected as three or an integral multiple of three, the upper and lower wind discs of the wind wheel can adopt a corresponding regular polygon structure, and each of the vanes is perpendicularly arranged at a corresponding vertex angle position of the wind wheel.

Figure 5:
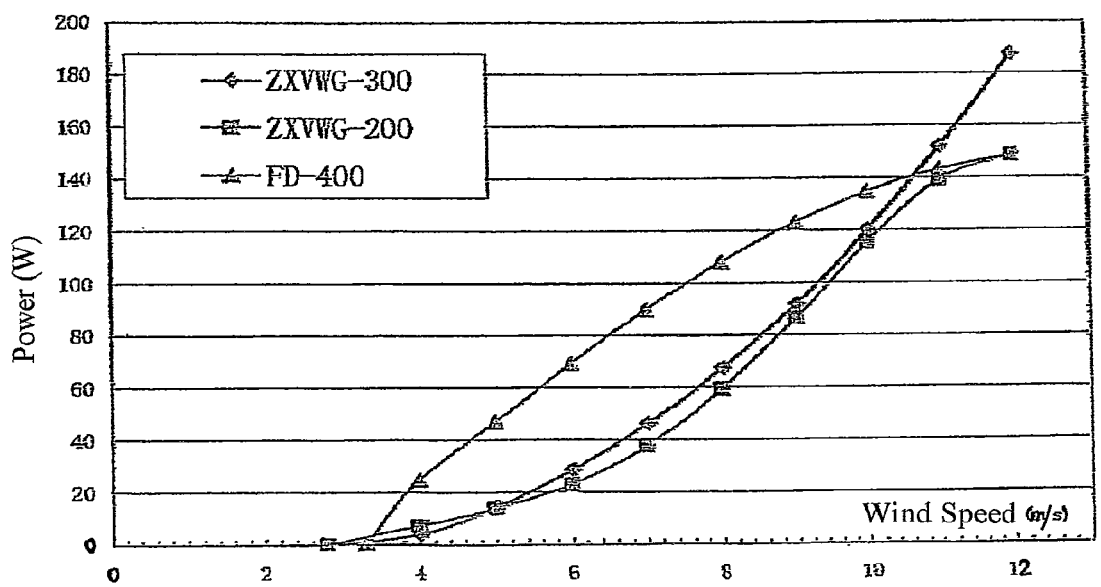
FIG. 5 is a comparison graph of power output characteristic curves of three types of wind power generators.

As shown in FIG. 5, ZXVWG-300 denotes an output characteristic curve of a 300 W generator designed according to the present invention, ZXVWG-200 denotes an output characteristic curve of a 200 W generator designed according to the present invention, and FD-400 denotes an output characteristic curve of a 400 W traditional horizontal shaft wind power generator. Upon the comparison test with the traditional wind power generator, the swept area of the generator according to the present invention is 26% less than that of the horizontal-shaft generator. In a situation that the capacity of the generator is 25% less than that of the traditional generator, at a wind speed of 12 m/s, the generation power of the wind power generator designed according to the present invention is about 26% higher than that of the traditional wind power generator, and has a rising tendency along the curve of the cube of the wind speed.

What is claimed is:

1. A constant direction four quadrant lift type vertical shaft wind power generator, comprising: a truss-type wind wheel, formed by an upper wind disc, a lower wind disc, and supporting rods; a speeder; and a generator, wherein the wind wheel and the speeder are sleeved on a central shaft, several groups of vanes are perpendicularly arranged at a diametral top end of the wind wheel by respective pivots thereof, the wind wheel and the vanes are disposed at an upper end of the wind power generator, and the generator, the speeder, and a controller are disposed at a bottom of the wind power generator, wherein:

an overall shape of the vanes is an air-foil shape with equal cross sections;
a height of the vanes is equivalent to that of the wind wheel;
a shape of the cross section is a circular-arc radius of a head portion that is $1/18$-$1/22$ of a vane chord length, an arc radius of an outer surface is $3/8$ of the chord length, an arc radius of an inner surface is $3/16$ of the chord length, a central angle of an overall circular-arc portion is 40-50 degrees, an arch height of a circular arc of the outer surface is 1/5-1/7 of the chord length, and an arch height of a circle chord of the inner surface is 1/10-1/14 of the chord length;

a back portion of each of the vanes is a linear intersection between the outer surface and the inner surface; and the pivots of the vanes are located at positions 1/7-1/6 of the chord length from the head portion.

2. The wind power generator according to claim 1, wherein a number of the vanes is three or an integral multiple of three, the wind wheel is of a corresponding regular polygon structure, and each of the vanes is perpendicularly arranged at a corresponding vertex angle position of the wind wheel.

3. The wind power generator according to claim 1, wherein the vanes are of a hollow structure with a framework braced therein, and the vanes are made of light, weather-resistant, and corrosion-resistant materials.

4. The wind power generator according to claim 1, wherein an arc-shaped wind collecting baffle is disposed at an upwind side of the wind wheel.

5. The wind power generator according to claim 1, further comprising: a strong wind cutout protection mechanism, wherein the mechanism is formed by a windward baffle or anemometer and a stop mechanism of the vanes, and medium and large-scaled units are fixed by adding inclined steel wire cables at a top end thereof.

6. The wind power generator according to claim 1, wherein a stop mechanism is disposed at a top and/or bottom portion of the pivots of the vanes, and the top and/or bottom portion of the pivots is correspondingly sleeved with a disc having a fan-shaped notch fitting with the pivots, a central angle of the notch is 65-75 degrees, and the stop mechanism is axially or radially arranged to fit with the fan-shaped notch, so as to control a maximum angle of attack to be 25-30 degrees when the vanes are in an upwind direction and a maximum angle of attack to be 40-45 degrees when the vanes are in a downwind direction.

7. The wind power generator according to claim 6, wherein the stop mechanism is a mechanical type or electrical type, and performs a stopping operation on the vanes by being inserted into and withdrawn out of the fan-shaped notch.

8. The wind power generator according to claim 7, wherein the mechanical-type stop mechanism comprises a stop assembly and a sliding rod, a guiding wheel is disposed at a top end of two sides of the sliding rod, a front end is connected with a sliding wheel, and a back end is connected with a windward baffle at the upper portion of the wind wheel through steel wires; and the electrical-type stop mechanism comprises an anemometer and a motor mechanism.

9. The wind power generator according to claim 1, wherein the wind wheel is stacked and expanded in a building block mode.

* * * * *